US012798186B2

(12) United States Patent

Maucher et al.

(10) Patent No.: US 12,798,186 B2
(45) Date of Patent: Nov. 17, 2026

(54) DEVICE AND METHOD FOR ADDITIVE MANUFACTURING OF A COMPONENT, AND METHOD FOR PROVIDING A DEVICE FOR ADDITIVE MANUFACTURING

(71) Applicant: PERI SE, Weissenhorn (DE)

(72) Inventors: Christian Maucher, Mindelzell (DE); Matthias Steppich, Guenzburg (DE); Franz Winter, Pfaffenhofen (DE)

(73) Assignee: PERI SE, Weissenhorn (DE)

( * ) Notice: Subject to any disclaimer, the term of this patent is extended or adjusted under 35 U.S.C. 154(b) by 66 days.

(21) Appl. No.: 18/571,547

(22) PCT Filed: Jun. 15, 2022

(86) PCT No.: PCT/EP2022/066349
§ 371 (c)(1),
(2) Date: Dec. 18, 2023

(87) PCT Pub. No.: WO2022/263535
PCT Pub. Date: Dec. 22, 2022

(65) Prior Publication Data

US 2024/0286351 A1 Aug. 29, 2024

(30) Foreign Application Priority Data

Jun. 17, 2021 (DE) ..................... 10 2021 115 715.3

(51) Int. Cl.
*B29C 64/232* (2017.01)
*B29C 64/236* (2017.01)
(Continued)

(52) U.S. Cl.
CPC .......... *B29C 64/232* (2017.08); *B29C 64/236* (2017.08); *B29C 64/241* (2017.08); *B33Y 30/00* (2014.12)

(58) Field of Classification Search
CPC ... B29C 64/245; B29C 64/214; B29C 64/241; B29C 64/236; B29C 64/232; B33Y 30/00
See application file for complete search history.

(56) References Cited

U.S. PATENT DOCUMENTS

| | | | |
|---|---|---|---|
| 10,047,531 | B2 | 8/2018 | Rogers |
| 2005/0194401 | A1 | 9/2005 | Khoshnevis |

(Continued)

FOREIGN PATENT DOCUMENTS

| | | |
|---|---|---|
| DE | 37 02 057 | 8/1988 |
| EP | 876 541 | 8/1999 |

(Continued)

OTHER PUBLICATIONS

International Search Report and Written Opinion dated Sep. 21, 2022 issued in PCT International Patent Application No. PCT/EP2022/066349, 15 pp.

(Continued)

*Primary Examiner* — Larry W Thrower
(74) *Attorney, Agent, or Firm* — NIXON & VANDERHYE P.C.

(57) ABSTRACT

A device for additive manufacturing of a component on a work surface has a material dispensing unit for depositing a building material. The device has, moreover, an actuator assembly, to which the material dispensing unit is fastened, and which is configured to move the material dispensing unit relative to the work surface. The actuator assembly has at least one strut, along the longitudinal axis of which the material dispensing unit can be moved. At least one of the struts of the actuator assembly can be fastened for sufficient structural stability to a stand frame which is set up next to the work surface and is independent of the strut.

16 Claims, 2 Drawing Sheets

(51) Int. Cl.
*B29C 64/241* (2017.01)
*B33Y 30/00* (2015.01)

(56) References Cited

U.S. PATENT DOCUMENTS

| | | | | |
|---|---|---|---|---|
| 2005/0196484 | A1* | 9/2005 | Khoshnevis | B28B 1/001 425/463 |
| 2007/0181519 | A1* | 8/2007 | Khoshnevis | E04G 21/0463 212/180 |
| 2014/0054817 | A1* | 2/2014 | Jaffe | B29C 64/236 264/129 |
| 2019/0316344 | A1 | 10/2019 | Pagani et al. | |
| 2021/0402643 | A1* | 12/2021 | Le Roux | E04G 21/04 |

FOREIGN PATENT DOCUMENTS

| | | |
|---|---|---|
| EP | 180 489 | 2/2002 |
| EP | 239 091 | 11/2017 |
| JP | 3-72166 | 3/1991 |
| JP | 7-91078 | 4/1995 |
| WO | WO 2016/166116 | 10/2016 |

OTHER PUBLICATIONS

German Search Report dated Apr. 6, 2022 issued in German Patent Application No. 10 2021 115 715.3, 7 pp.

* cited by examiner

DEVICE AND METHOD FOR ADDITIVE MANUFACTURING OF A COMPONENT, AND METHOD FOR PROVIDING A DEVICE FOR ADDITIVE MANUFACTURING

The present application is the U.S. national phase of International Application No. PCT/EP2022/066349 filed Jun. 15, 2022 which designated the U.S. and claims priority of German patent application no. 10 2021 115 715.3 filed Jun. 17, 2021, the entire contents of each of which are hereby incorporated herein by reference in their entirety.

The invention relates to a device for additive manufacturing of a component on a work surface, having a material dispensing unit for depositing a building material and an actuator assembly on which the material dispensing unit is fastened.

The invention further relates to an arrangement for erecting a structure, having a device for additive manufacturing of a component of the structure.

The invention also relates to a method for additive manufacturing of a component on a work surface and a method for providing a device for additive manufacturing of a component.

Methods for additively manufacturing three-dimensional objects are known for manufacturing models, prototypes, tools, and end products, for example. In this case, starting materials in the form of liquids, powders, or filaments made of thermoplastic plastics are deposited by a print head attached to an end effector of an actuator assembly in order to build up the object in layers based upon 3-D data of the object to be manufactured. Such a method is also referred to, inter alia, as a "generative manufacturing method" or as "3-D printing."

In the meantime, it is also known to use additive manufacturing methods for manufacturing entire structures or parts of structures (for example, walls or formwork). The additive manufacturing of components or of entire structures can significantly increase productivity in the construction industry. As a result of so-called "3-D concrete printing," structures can be produced faster and at lower costs. With the aid of a 3-D concrete printer, concrete structures can be realized quickly and economically, while at the same time having maximum design freedom.

3-D concrete printers are regularly provided in the so-called portal or gantry design. The material dispensing unit or print head is attached to a crossbeam, which in turn runs between two parallel horizontal beams above a work surface. The print head is movable along the longitudinal axis of the crossbeam, wherein the crossbeam is also able to move back and forth along the longitudinal axis of the horizontal beams. In this way, a horizontal movement parallel to the work surface in the provided print paths is possible. In order to also realize a vertical movement in order to deposit the component on the work surface in layers, the horizontal beams are connected in a vertically movable manner to corresponding vertical struts which form a vertical guide rail. Due to the mentioned structure, the print head can ultimately move in all three spatial directions and produce building structures additively.

On the construction site, the vertical struts must be anchored for sufficient structural stability with weights, such as concrete stones, which are brought to the corresponding locations with a crane. First, the concrete blocks thus have to be provided at the corresponding positions at which the vertical struts are finally fastened. The gantry printer can then be further set up.

Setting up the 3-D concrete printer is therefore extremely time-consuming overall, not least due to the need for a construction crane or even a heavy-duty crane just to transport the concrete weights to the appropriate places on the construction site and to install them around the 3-D printer. In order to be able to use the crane at all, sufficient space is required on the construction site or at the roadside; the crane site may have to be prepared at great expense (bringing in load-bearing material, leveling and compacting the crane site, etc.). Furthermore, the areas of the concrete weights or foundation stones must be leveled and compacted extremely precisely in relation to each other so that the 3-D concrete printer can be set up successfully, and the components can then be produced with sufficient accuracy.

Not least for this reason, additive manufacturing is not yet regularly used in current practice in the construction industry.

In view of the known prior art, the object of the present invention is to provide a device for additive manufacturing of a component and an arrangement for erecting a structure, the design or provision of which is simplified compared to the prior art.

The present invention is also based upon the object of providing a method for additive manufacturing of a component which can be used more efficiently compared to the prior art.

Finally, it is also the object of the invention to provide a more efficient method compared to the prior art for installing a device for additive manufacturing.

The features described below relate to advantageous embodiments and variants of the invention.

A device for additive manufacturing of a component on a work area is provided.

The component to be produced can in particular be a structure, a part of a structure, or a formwork for the erection of a structure. In principle, however, any three-dimensional objects can be understood as the "component" according to the invention. Any three-dimensional objects can thus be additively manufactured in the context of the invention.

In the context of the invention, building structures can be understood as structures of all types—in particular, however, protective structures such as buildings for the accommodation and stay of humans or animals, protective walls, dikes, shelters, enclosures, weirs and fortification systems, and city walls and prison walls. However, a structure can also be a traffic structure—for example, a road, a pedestrian pathway, a bridge, or a tunnel. Supply and disposal structures such as wells, sewage treatment plants, dams, chimneys, or temporary structures can also be manufactured additively within the scope of the invention.

In the context of the invention, a part of a structure or a component can in particular be a functional component of a structure, and in particular a functional or geometrically-cohesive part of the structure such as a wall, a support, or a stair. A building part consisting of multiple components of the structure (for example, a floor or a story of a building) can also fall under the term, "component," in the context of the invention. The already mentioned formwork can also be a component in the context of the invention, and in particular if the formwork subsequently forms a part of the structure—for example, the outer part of a wall of the building.

A base can be provided on which the component is erected. The work surface thus preferably extends on the surface of the base provided for the construction. In the context of the invention, the base can be understood to mean in particular a subsoil and/or a foundation on which the structure or component is erected. However, the base can also be a floor of a multi-story building or a mobile, movable base. For example, it can be provided to transport the component together with the base after additive manufacturing to its intended installation site. In principle, any surface on which the component can be erected (permanently or temporarily) can be suitable as a base on which the work surface extends.

Multiple components can also be produced using the proposed device or the method described below, and possibly also components that are not connected to one another.

According to the invention, the device has a material dispensing unit for depositing a building material.

In particular, it can be provided that the material output unit be designed as a nozzle, print head, or extruder in order to dispense the building material.

According to the invention, the device also has an actuator assembly on which the material dispensing unit is fastened. The actuator assembly is configured to move the material dispensing unit relative to the work surface—in particular, above or above the work surface, and preferably parallel and/or orthogonally to the work surface.

The actuator assembly preferably moves the material dispensing unit along a predetermined print path. The print path can, for example, be calculated based upon 3-D data of the component. Corresponding method steps are already known from conventional 3-D printing. The 3-D data of the component can in particular be three-dimensional CAD data. The component can be represented in the data in particular by point clouds, edge models, surface models, and/or volume models.

It can be provided that the device have a control device which is set up to control the actuator assembly for moving the material dispensing unit. The control device can also be configured to control the material dispensing unit as a function of the print paths and/or to regulate the dispensing or depositing of the building material. In principle, the control device can be configured to control and/or regulate the entire method for manufacturing the component or individual method steps of the method.

For example, the control device can be configured to calculate the print pathway on the basis of the input 3-D data. The control device can be configured, for example, to calculate a virtual model of the component in the known STL format ("standard triangulation/tesselation language" format) from the 3-D data of the component. In the context of the STL format, the component data can be described with the aid of triangular facets. The principle is known and will therefore not be described in more detail. An STL interface is a standard interface of many CAD systems. In the present case, the control device can be configured to first calculate STL data for further processing from any 3-D CAD data. However, the control device can also be configured to record and further process 3-D data in the STL format. In principle, any other data format can also be provided.

Regardless of whether the STL data were generated by the control device itself or only transmitted to it, the control device can be configured to convert the component data into printer data for 3-D printing (or for additive manufacturing) using the STL data (or using other 3-D data). For this purpose, it can be provided, inter alia, to convert the 3-D data or STL data into individual layers to be printed (so-called "slicing"), after which the print paths are calculated for the individual layers in order to predetermine the movements of the material output unit.

At this point, it should be emphasized that the actuator assembly does not necessarily have to move the material dispensing unit on the basis of predefined print paths, and in particular not in an automated manner. A manual electronic control of the actuator assembly (for example, with a remote control) or even manual mechanical operation of the actuator assembly by an operator can also be provided. When reference is made below to control along predefined print paths, this is not to be understood as limiting.

According to the invention, the actuator assembly has at least one strut along the longitudinal axis of which the material dispensing unit can be moved.

By means of the actuator assembly, the material dispensing unit can deposit the building material in layers, and preferably along the predetermined print path. For the movement of the material dispensing unit by means of the actuator assembly along the strut(s), an actuator or several actuators can be provided which can be controlled, for example, by the already mentioned control device individually or in groups. Manual actuation up to a purely manual initiation of movement can also be provided—if necessary, in this case, it is even possible to dispense with actuators, wherein the actuators can also be designed to support the manually/mechanically-initiated movement.

Finally, the actuator assembly can ensure a horizontal and/or vertical movement of the material dispensing unit by moving the material dispensing unit along correspondingly oriented struts.

Insofar as the invention refers to a "vertical" or "horizontal" direction, the vertical direction is to be understood in relation to the perpendicular to the base or to the work surface, and the horizontal direction at right angles thereto.

According to the invention, it is provided that, for a sufficient structural stability or security against tilting, the at least one strut be able to be fastened to a scaffold, and in particular a stand frame, which is set up next to or on the work surface and is independent of the strut.

In this way, the at least one strut, which does not have sufficient structural stability on its own, insofar as it can be erected at all, can be attached to a scaffold or stand frame that is preferably already present on the construction site. The scaffold is accordingly preferably a standard scaffold used in construction (for example, a facade scaffolding, a support framework, or a scaffold tower) which can advantageously be used for the erection of the device according to the invention, and preferably without itself being part of the device.

Since the device can be attached to the stand frame with sufficient structural stability and tilt resistance by means of the struts, the device can be provided and therefore used more efficiently and flexibly. In particular, a 3-D concrete printer can thus be installed or set up on a construction site with comparatively little effort.

Instead of separate concrete weights for the structurally stable fastening/anchoring of, for example, vertical struts of the 3-D concrete printer, it is thus advantageously possible to use the stand frame, which takes on the task of providing the struts and thus the device overall with sufficient structural stability or safety against tilting. This means that a construction crane or even a heavy-duty crane is no longer absolutely necessary for setting up the 3-D concrete printer.

Due to the high load-bearing capacity of the scaffold sections or the stand frames used, the struts of the device can also be made smaller, which further facilitates the construction of the device.

The proposed design of the device will make it possible in the future to expand a scaffold already present on a construction site into a 3-D concrete printer with little effort.

Dismantling the device is also easier compared to the state of the art. Once all the components or building parts to be printed have been completed, the printing portal/gantry (actuator assembly with material output unit and struts) can be easily detached from the scaffolding sections or stand frames and transported away. The stand frames themselves and, for example, a facade scaffolding attached thereto can still remain on the construction site and can be used for external work still to be completed and/or for the construction of a roof.

In a preferred development of the invention, it can be provided that at least one of the struts be a vertical strut aligned at an angle, and preferably orthogonally, to the work surface, and along the longitudinal axis of which the material dispensing unit can be moved in order to deposit the building material in layers.

It can be provided that the material dispensing unit be fastened to an end effector of the actuator assembly and be moved along the print path by the actuator assembly. The end effector is preferably designed as a trolley of an actuator assembly designed as a portal crane unit, and can be moved vertically along the vertical strut(s). Such a system is also known under the term, "portal/gantry printer."

According to a development of the invention, it can be provided that the at least one strut, which is fastened to the stand frame for reasons of sufficient structural stability, be at least one of the vertical struts mentioned. In principle, however, the strut can also be at least one horizontally- or diagonally-running strut (for example, the horizontal beam or crossbeam mentioned below).

The actuator assembly can also be designed as a robot or robot arm, and in particular as an industrial robot. For example, a six-axis robot or another movement system, e.g., a hexapod or a five-axis system, or a combination of several movement units can be provided in order to move the material dispensing unit horizontally and/or vertically. Pivotable and/or telescopically-extendable movement units can also be provided for forming the actuator assembly.

The actuator assembly can be designed to move the material dispensing unit in at least one degree of translational freedom, preferably in at least two degrees of translational freedom, and very particularly preferably in all three degrees of translational freedom, in order to dispense the building material. The movement along the third (vertical) translational degree of freedom is preferably made possible by the movement along the longitudinal axis of the vertical strut(s) (but it can also be provided, for example, to enable the vertical movement by suspension of the material dispensing unit and the at least one strut of the actuator assembly—for example, in connection with a cable pull and a hydraulic system). In particular, a material output unit movable along all translational degrees of freedom enables flexible manufacture of any three-dimensional structures or three-dimensional components of structures on the base.

The material output unit can even be moved in at least four degrees of freedom, and in particular in all three translational degrees of freedom and at least one degree of rotational freedom. Particularly preferably, a movement along five degrees of freedom (preferably all three translational degrees of freedom and two rotational degrees of freedom) and very particularly preferably along all six degrees of freedom can be provided. In particular, if the material output unit is movable in all translational degrees of freedom and in addition in one or more rotational degrees of freedom, the individual print paths can be deposited with the greatest flexibility. In this way, the geometry of the component can be predefined virtually as desired. For example, a tilting of the material output unit and/or a rotation of the material output unit can be provided during the deposition of the building material.

In a preferred development of the invention, it can be provided that the device have at least two of the mentioned vertical struts, which are spaced apart from one another along the work surface and which together form a first group of vertical struts.

The first group of vertical struts can in principle have any number of vertical struts—for example, also three vertical struts or more, four vertical struts or more, five vertical struts or more, six vertical struts, or even more vertical struts.

All vertical struts of the first group are preferably arranged in alignment, i.e., along a straight line. In principle, however, the vertical struts of the first group can also be arranged along a curved line—for example, also arranged along the circumference of a circle.

In a development, it can also be provided that the device have at least two more of the mentioned vertical struts, which are spaced apart from one another along the work surface and from the vertical struts of the first group, and which together form a second group of vertical struts.

The second group of vertical struts can in principle have any number of vertical struts—for example, also three vertical struts or more, four vertical struts or more, five vertical struts or more, six vertical struts, or even more vertical struts.

All vertical struts of the second group are preferably arranged in alignment, i.e., along a straight line. In principle, however, the vertical struts of the second group can also be arranged along a curved line—for example, also arranged along the circumference of a circle.

It can also be provided that still further groups of vertical struts be provided—for example, a third group of vertical struts, a fourth group of vertical struts, a fifth group of vertical struts, a sixth group of vertical struts, or even more groups of vertical struts, each having vertical struts spaced apart from the other groups and from one another.

If several groups of vertical struts are provided, all groups preferably have the same number of vertical struts. However, this is not absolutely necessary.

In an advantageous development of the invention, it can be provided that all vertical struts be fastened to the actuator assembly.

If several vertical struts are used, the stability and structural stability of the device can be further improved—in particular, if the actuator assembly is directly (preferably) or at least indirectly connected to all vertical struts.

Precisely one actuator can be provided in order to uniformly move the actuator assembly fastened to several, or all, vertical struts along the longitudinal axes of the vertical struts. However, several actuators can also be provided, e.g., one actuator per group of vertical struts or one actuator per vertical strut, which move the actuator assembly uniformly along the longitudinal axes of the vertical struts, and preferably in synchronized fashion.

An actuator or several actuators can also be provided in order to move the material dispensing unit parallel to the work surface by means of the actuator assembly. For example, one actuator can be provided per degree of freedom.

According to a development of the invention, it can be provided that the vertical struts be aligned orthogonally to the work surface.

In principle, however, an arrangement of the vertical struts at an angle to the work surface differing from 90° Can also be provided, e.g., an installation angle between 45° and 90°, but preferably an installation angle between 80° and 90°, particularly preferably an installation angle between 85° and 90°, and in particular an installation angle of substantially 90°.

Preferably, the alignment or installation angle of all vertical struts of the device is identical.

According to a development of the invention, it can be provided that at least one further of the mentioned struts of the actuator assembly be a horizontal beam oriented parallel (or at least substantially parallel) to the work surface, and along the longitudinal axis of which the material dispensing unit can be moved in order to deposit the building material parallel to the work surface along a first spatial direction.

In a particularly preferred embodiment of the invention, exactly two groups of vertical struts are provided, wherein each group is assigned exactly one horizontal beam, which is attached to the vertical struts of the assigned group. The vertical struts of the two groups and the horizontal beams are preferably arranged in such a way that the horizontal beams run parallel to one another with an offset, above or next to the work surface.

According to a development of the invention, it can be provided that the at least one horizontal beam be fastened to exactly one of the vertical struts or to all vertical struts of a common group of vertical struts and be movable along the longitudinal axes of the vertical struts.

Furthermore, in one embodiment of the invention, it can be provided that the material dispensing unit be fastened to the horizontal beam—in particular, if precisely one horizontal beam is provided.

The material dispensing unit can thus be movable along the longitudinal axis of the horizontal beam.

In a development of the invention, it can be provided that at least one further of the struts of the actuator assembly be a crossbeam oriented parallel to the work surface, and along the longitudinal axis of which the material dispensing unit is movable in order to deposit the building material parallel to the work surface along a second spatial direction, and which is fastened to exactly one of the horizontal beams or to two horizontal beams arranged opposite one another, wherein the material dispensing unit is fastened to the crossbeam.

The material dispensing unit can thus be movable along the longitudinal axis of the crossbeam, wherein the crossbeam can be movable relative to the horizontal beam. In this way, a particularly flexible mobility of the material dispensing unit can be enabled.

In an advantageous development of the invention, it can be provided that the material dispensing unit be able to be moved over the work surface in that the horizontal beam is designed to be pivotable about the longitudinal axis of the vertical strut. For this purpose, the horizontal beam can have a rotary joint or be connected to the vertical strut via a rotary joint.

Alternatively or additionally, it can also be provided that the crossbeam be designed to be pivotable relative to the horizontal beam. For this purpose, the crossbeam can have a rotary joint or be connected to the horizontal beam via a rotary joint.

In a development of the invention, it can also be provided that the material dispensing unit be able to be moved over the work surface in that the material dispensing unit is linearly movable along the horizontal beam or preferably along the crossbeam. Additionally or alternatively, it can be provided that the crossbeam be linearly movable along the horizontal beam.

In the particularly preferred embodiment of the actuator assembly as a gantry crane system, the material dispensing unit can be linearly movable along the crossbeam, while the crossbeam extends between two horizontal beams and is linearly movable along the horizontal beams, and wherein the two horizontal beams can be moved vertically along the vertical struts. In this way, the material dispensing unit can ultimately be moved along all three degrees of freedom of translation.

In an advantageous development of the invention, it can be provided that the vertical strut, the horizontal beam, and/or the crossbeam each be rigid, elongated components, and preferably beams—for example, steel profile beams. If necessary, the vertical strut, the horizontal beam, and/or the crossbeam can, however, also be understood in the context of the invention as cables—in particular, wire cables, and preferably steel cables—or can be designed as such.

The vertical strut can have a guide rail for the actuator assembly or can be designed as a guide rail for the actuator assembly.

The vertical strut, the horizontal beam, and/or the crossbeams can each be designed in one or more parts. A multipart design is preferred here, since this can improve the assembly or the setting up of the device on the construction site, the transport, the storage, and the modularity of the device.

In a further development of the invention, it can be provided in particular that the at least one vertical strut be formed in several parts along the longitudinal axis from individual modular struts that can be connected to one another.

A multipart design of the vertical strut can be advantageous, for example, since lower portions of the vertical beam can then already be dismantled or removed while the component is still being manufactured at a height position thereabove. In the lower section, installation space can then be freed up during the production of the component—for example, to enable further assembly work to be carried out on the component and/or to erect a facade scaffolding.

In an advantageous development of the invention, it can be provided that the building material be a flowable mixed concrete ("fresh concrete") or mortar.

Preferably, a concrete formulation with small aggregate is sought. In particular, a concrete can be provided which rapidly sets and in particular has a high green strength. It can also be provided that the concrete have one or more additives—for example, in order to prevent excessively rapid drying in order to increase the pumpability and/or to modify the color.

As an alternative to the use of concrete or mortar as a building material, however, any other building material can also be provided which may be suitable for manufacturing or building structures or components thereof—in particular, polymer concrete, gypsum, clay, a plastic—preferably a thermoplastic—, but also metals or alloys. In principle, in the context of the invention, any building materials can be provided.

In principle, the component can be produced from one, two, three, four, or even more starting materials or building materials. For example, various concrete mixtures, plastics, metals, and/or alloys can be combined with one another as desired.

The material output unit can be designed to dispense the building material in a defined form—for example, in print paths with rectangular or round edges. In cross-section, the individual print paths can, for example, be discharged as rectangular (square or elongated), round, or oval. The material output unit preferably outputs the building material in the provided wall thickness of the component to be printed.

The material output unit can optionally have lateral guide legs, and in particular two opposing guide legs, in order to laterally stabilize and/or form the building material while being discharged.

It can be provided that the material dispensing unit be designed to selectively deposit print paths with a varying cross-sectional geometry, and/or the material dispensing unit on the actuator assembly be able to be replaced manually or preferably automatically, or that several material dispensing units be arranged on the actuator assembly that are optionally used sequentially or in parallel, wherein each material dispensing unit is configured for depositing print paths with a specific cross-sectional geometry.

It can optionally also be provided that the material dispensing unit be designed to selectively deposit print paths of different building materials and/or that the material dispensing unit be able to be replaced manually or preferably automatically, or that several material dispensing units be arranged on the actuator assembly, wherein each material dispensing unit is configured for depositing a specific building material. The flexibility of the device can be further improved by the possibility of depositing different building materials and/or different cross-sectional geometries.

In an advantageous development of the invention, it can be provided that the strut, and in particular the vertical strut, have at least one primary fastening element for fastening to the stand frame.

Insofar as the struts, e.g., the vertical struts, are formed from the individual modular struts that can be connected to one another along the longitudinal axis, it can be provided in a further development relevant to this that each of the modular struts have at least one of the primary fastening elements.

In an advantageous further development, it can be provided in particular that the at least one strut (in particular, the at least one vertical strut) have several primary fastening elements distributed along the longitudinal axis for fastening to the stand frame, which are preferably spaced equidistantly from one another.

In a development, it can also be provided that the at least one strut (in particular, the at least one vertical strut) have at least two primary fastening elements which are arranged at a common height position along the longitudinal axis and are spaced apart from one another.

The above-proposed variants for distributing the primary fastening elements along the longitudinal axis and/or at a common height position can improve the stability of the connection between strut and stand frame.

The primary fastening element can in particular be a hook or an eyelet. However, the primary fastening element can also be a support surface or a pipe coupling. Preferably, the primary fastening element is a hook which can be fitted in an eyelet of a scaffolding rosette which is present anyway on the stand frame.

In a development of the invention, it can preferably be provided that the primary fastening element be designed as a hook, wedge element, scaffold coupling, screw element, clamping element, latching recess, or a combination thereof.

As an example of a suitable primary fastening element, reference is made in particular to a combination of hook or "wedge head" and wedge element in order to provide a self-securing latch connection (known, for example, as the "Gravity Lock System" of the applicant; cf., for example, EP 0 876 541 B1). When the wedge head is inserted into a corresponding secondary fastening element (for example, a latching recess in a perforated disk or rosette mentioned below), the wedge element is able to penetrate the hole or latching recess by its own gravity and lock the hook or wedge head in the latching recess. This ensures that the device can be set up quickly and safely.

Clamp couplings, double mandrel couplings, distance couplings, normal couplings, wedge head couplings (as described, for example, in DE 37 02 057 A1), or a latch for a so-called "cuplock system" (cf., for example, U.S. Pat. No. 10,047,531 B2) can also be provided to implement the primary fastening element.

The invention also relates to an arrangement for erecting a structure, having a device for additively manufacturing a component of the structure according to the preceding and following embodiments, and the stand frame or at least one stand frame. The at least one strut (in particular, the at least one vertical strut) is fastened to the at least one stand frame.

In a development of the invention, it can be provided that the stand frame have at least one secondary fastening element on which the primary fastening element of the vertical strut can be fastened.

In particular, it can be provided that the secondary fastening element be designed as a hook, wedge element, scaffold coupling, screw element, clamping element, latching recess, or a combination thereof, and preferably as a latching recess or eyelet in a perforated disk.

As an example of a suitable secondary fastening element, reference is made in particular to a perforated disk or rosette with several locking recesses or holes, which can be used in combination with the primary fastening element of the strut (in particular, with the described wedge head-wedge element system or "Gravity Lock System"). Secondary fastening elements that are suitable in conjunction with clamp couplings, double mandrel couplings, spacer couplings, standard couplings, wedge head couplings, or a latch for a so-called "cuplock system" can also be provided.

However, the secondary fastening element can also be a support surface or a pipe coupling. The secondary fastening element is preferably an eyelet of a scaffolding rosette which is present anyway on the stand frame.

This means that conventional receptacle devices (such as scaffolding rosettes) can be used on the vertical posts of the stand frame, into which the primary fastening element or into which the vertical struts can be inserted or hooked in order to connect the device to the stand frames.

According to a development of the invention, it can be provided that each of the struts (in particular, vertical struts) be fastened to a stand frame. Each of the struts or vertical struts is preferably fastened to its own stand frame, and in particular to stand frames which are each spaced apart from one another in a free-standing manner (on or next to the work surface).

However, it may also be provided that several vertical struts be fastened to a common stand frame—for example, all vertical struts of a common group of vertical struts.

The individual stand frames can optionally also be connected to one another or to an adjacent structure such as a building or a rock in order to further increase the structural stability overall.

In an advantageous development of the invention, it can be provided that the vertical strut be fastened to the stand frame in a suspended manner.

Several advantages can result from a suspended fastening.

In particular, the height at which the vertical struts and thus the entire device is fastened to the stand frame can be extremely flexible. The height of the device can also be adapted to the progress of the construction work as needed, by unhooking the vertical struts from the stand and hooking them back in at a higher position. This advantage is important in particular when the vertical struts are modular or multi-part, as described above. In this case, it is possible to remove parts of the vertical brace in a lower section and optionally re-attach them at the upper end. The vertical strut can thereby be shorter overall, since its vertical position can be adapted to the progress of the construction.

Furthermore, the space requirement of the device can be reduced if the vertical struts can be mounted in suspended fashion, since the lower section of the stand frames then remains free—for example, for the simultaneous erection of a facade scaffolding. As already mentioned, a modular vertical strut in particular can be dismantled in the lower area to free up space for further processing of the component or a facade scaffolding if required.

In an advantageous development of the invention, it can be provided that the stand frame be formed from several interconnected horizontal scaffold posts, vertical scaffold posts, and/or diagonal scaffold posts.

The stand frame can have, for example, at least two vertical scaffold posts which each have secondary fastening elements, and which are connected to one another via the secondary fastening elements with horizontal and/or diagonal scaffold posts, wherein the horizontal and/or diagonal scaffold posts preferably have the same fastening elements for connection to the secondary fastening elements as the struts or vertical struts of the actuator assembly.

In particular, it can be provided that the stand frame have at least four vertical scaffold posts which are preferably aligned parallel to one another. The at least four vertical scaffold posts can finally be connected to one another with horizontal and/or vertical scaffold posts. In particular, such a structure makes it possible for the stand frame to stand upright by itself or independently. The strut, and in particular the vertical strut of the actuator assembly, is preferably fastened to at least one of the at least four vertical scaffold posts.

In an advantageous development of the invention, it can thus be provided that the secondary fastening elements be arranged on the vertical scaffold posts of the stand frame. Each vertical scaffold post preferably has several secondary fastening elements arranged distributed along its longitudinal axis. According to this development, it can additionally be provided in particular that the horizontal scaffold posts and/or the diagonal scaffold posts be fastened to the vertical scaffold posts via the secondary fastening elements of the vertical scaffold posts.

In particular, it can be a standard scaffolding known from construction technology. Corresponding scaffold setup techniques are sufficiently known, so that further details are omitted here. In principle, the invention is suitable for use with any scaffolds or stand frames, but is particularly advantageously used for stand frames with posts connected via scaffolding rosettes and latching heads, since the scaffolding rosettes can be advantageously reused for hooking in the vertical struts.

According to a development of the invention, it can be provided that the stand frame have individual, height-adjustable feet.

Preferably, the stand frames or scaffold sections of the stand frames can be varied in alignment via foot spindles or scaffold spindles or the like in order to be able to correctly install and align the device.

This can further increase the stability. In addition, height differences and unevenness of the underlying surface can be compensated for, so that it may be possible to dispense with a preceding leveling of the underlying surface.

For further improvement, it can also be provided that the stand frame, and in particular the vertical posts, be partly equipped with an integrated spirit level. In this way, an alignment of the stand frame can be carried out quickly and conveniently—for example, by adjusting the height of the feet.

According to a development, it can be provided that the arrangement have at least one weight which is connected to the bottom end of the stand frame or which is arranged (for example, inserted) on or in the stand frame in the region of the bottom end, in order to weight the stand frame for sufficient structural stability.

However, a weighting is not absolutely necessary.

In an advantageous development, it can in particular be provided that the weight be a liquid tank that can be filled on a construction site, and in particular a water tank.

The use according to the invention of the stand frame for fastening the vertical struts of the device can also result in further advantages in addition to those already mentioned, due to synergy effects.

In a development of the invention, it can for example be provided that the arrangement have a facade scaffolding connected to the at least one stand frame.

In particular, if the structure has already been partially manufactured (printed), e.g., when the ground floor has been completed, the facade scaffolding can be constructed between the portal structure and the printed outer walls, which facade structure, as in conventional construction, is used for example to plaster the outer walls, to attach facades, to install windows, or to construct a roof. This advantage results in particular in combination with a multipart vertical strut, as already mentioned above. The vertical strut can then be at least partially removed in the lower region, as a result of which space can be freed up for the construction of the facade scaffolding, while the device can continue to be additively manufactured at a greater height position.

The stand frame can thus on the one hand ensure the structural stability of the device, and on the other the structural stability of the facade scaffolding. The facade scaffolding and the vertical struts can in particular be fastened jointly to the stand frame(s).

At this point, it should be mentioned that the stand frame can in principle also be part of the facade scaffolding, or can be made as a facade scaffolding.

It can also be provided that the arrangement have a construction site roofing connected to the at least one stand frame.

Furthermore, it can be provided that the arrangement have a construction site screen element extending between several of the stand frames.

In principle, further advantageous uses of the stand frame are also possible. The above examples are therefore not to be understood as limiting.

The invention also relates to a method for additive manufacturing of a component on a work surface, having at least the following method steps:

a) depositing a building material from a material dispensing unit;

b) moving the material dispensing unit relative to the work surface (preferably along predetermined print paths) by means of an actuator assembly on which the material dispensing unit is fastened, wherein the material dispensing unit is moved along the longitudinal axis of at least one strut of the actuator assembly which is fastened to a stand frame set up next to the work surface and independent of the vertical strut.

In particular, it can be provided that a lower section of the component be additively manufactured first—for example, a floor of a building. Further sections of the component can then be manufactured, such as a subsequent floor of the building.

It can be provided that, after the production of a first vertical section of the component, i.e., for example, after the production of a floor, the vertical rail of the actuator assembly be removed in a lower section—in particular, when the vertical rail has a modular or multipart design—and optionally to re-attach the disassembled parts to the upper end of the vertical rail. In this way, space can be freed up in the lower area after the completion of a floor—for example, in order to carry out additional work (facade work, etc.) on the component or building. For example, a facade scaffolding can be erected in the dismantled region of the vertical strut.

The invention also relates to a computer program comprising control commands which, when the program is executed by a control device, cause the latter to execute a method according to the above and subsequent embodiments.

The control device can be designed as a microprocessor. Instead of a microprocessor, any other device for implementing the control device can also be provided, e.g., one or more arrangements of discrete electrical components on a printed circuit board, a programmable logic controller (PLC), an application-specific integrated circuit (ASIC), or another programmable circuit—for example, also a field programmable gate array (FPGA), a programmable logical arrangement (PLA), and/or a commercially available computer.

According to an embodiment of the invention, it can be provided that the print path extend at least in sections along a reinforcement. However, it can also be provided that a reinforcement be provided only partially, or sectionally, or not at all. Reinforcements are known in principle and can be included in the method according to the invention as desired in order to erect the component with increased load-bearing strength. The reinforcement can be set up or laid by a professional—preferably before the start of depositing the building material by the material output unit. The reinforcement can optionally be connected to other components and/or to the base with a connecting reinforcement or in some other way. However, a free-standing, i.e., unconnected, reinforcement can also optionally be provided. The position of the reinforcement can be taken into account in the 3-D data when calculating the print pathway.

It can also be provided that the proposed method be used for the additive manufacturing of a formwork component. The component according to the invention can therefore be a formwork component. In particular, the component can be a complete formwork (i.e., a hollow mold like a casting mold) consisting of two formwork components running parallel to one another.

The invention also relates to a method for providing a device for additive manufacturing of a component on a work surface, having at least the following method steps:

a) providing a material dispensing unit for depositing a building material;
b) providing an actuator assembly with at least one strut (in particular, at least one vertical strut) and fastening the material dispensing unit to the actuator assembly in such a way that the material dispensing unit can be moved by the actuator assembly along the longitudinal axis of the at least one strut relative to the work surface;
c) fastening at least one of the struts (in particular, at least one vertical strut) to a stand frame set up next to the work surface and independent of the strut or vertical strut, in order to ensure sufficient structural stability of the device.

A 3-D printer, and in particular a 3-D concrete printer, can in this way advantageously be fastened to an existing scaffold structure.

The stand frame can therefore be erected first—either as part of the method according to the invention or as part of the preparatory work on the construction site. The stand frame or stand frames can be arranged adjacent to a region (in particular, next to or on the mentioned work surface) in which a building or a part of a building is to be additively manufactured. A roof or a weather protection roof or a construction site screen, for example, can additionally be fastened to the stand frame. Furthermore, the stand frames can be optionally expanded later to form a facade scaffolding, or can be connected to facade scaffolding elements.

Optionally, it can be provided that at least one weight be connected to the bottom end of the stand frame or be arranged in or on the stand frame in the region of the bottom end in order to increase the structural stability of the stand frame. In particular, the weight can be a fillable water tank, which is first brought to the construction site in its empty state and then filled once it has been placed in the stand frame.

Via fastening elements of the vertical struts, which engage in corresponding receiving devices of the stand frame (for example, hooks of the vertical struts that engage in standard scaffolding rosettes), the vertical struts can be fastened to the stand frames in a detachable, and preferably suspended, manner.

The invention also relates to a strut, and preferably a vertical strut, for use with a device or arrangement according to the invention. The strut or vertical strut is preferably part of an actuator assembly and is designed to enable a movement of a material dispensing unit along its longitudinal axis. The strut or vertical strut can preferably be fastened to a stand frame independent of the strut or vertical strut for sufficient structural stability, and particularly preferably has at least one primary fastening element for this purpose.

Features that have been described in connection with one of the subjects of the invention, viz., given by the device according to the invention, the arrangement according to the invention, one of the methods according to the invention, the strut, or the computer program, can also be advantageously implemented for the other subjects of the invention. Likewise, advantages that were mentioned in connection with one of the subjects of the invention can also be understood in relation to the other subjects of the invention.

In addition, it should be pointed out that terms such as "comprising," "having," or "with" do not exclude any other features or steps. Furthermore, terms such as "one" or "the" which refer to a single number of steps or features do not exclude a plurality of features or steps—and vice versa.

In a puristic embodiment of the invention, however, it may also be provided that the features introduced in the invention by the terms, "comprising," "having," or "with," be exhaustively enumerated. Accordingly, one or more enumerations of features may be considered complete in the context of the invention—for example, each considered for each claim.

It should be noted that designations such as "first" or "second," etc., are used primarily for purposes of distinguishing respective device or process features and are not necessarily intended to imply that features are mutually dependent or interrelated.

Furthermore, it should be emphasized that the values and parameters described herein include deviations or fluctuations of ±10% or less, preferably ±5% or less, more preferably ±1% or less, and very particularly preferably ±0.1% or less of the named value or parameter, provided that these deviations are not ruled out in practice in the implementation of the invention. The indication of ranges by initial and end values also comprises all those values and fractions which are enclosed by the designated range, and in particular the initial and end values and a respective average value.

Exemplary embodiments of the invention are described in more detail below with reference to the drawings.

The figures each show preferred exemplary embodiments in which individual features of the present invention are shown in combination with one another. Features of an exemplary embodiment can also be implemented separately from the other features of the same exemplary embodiment and can accordingly be easily combined with features of other exemplary embodiments by a person skilled in the art to form further useful combinations and sub-combinations.

In the figures, functionally identical elements are provided with the same reference signs.

In the figures, schematically:

Figure 1:
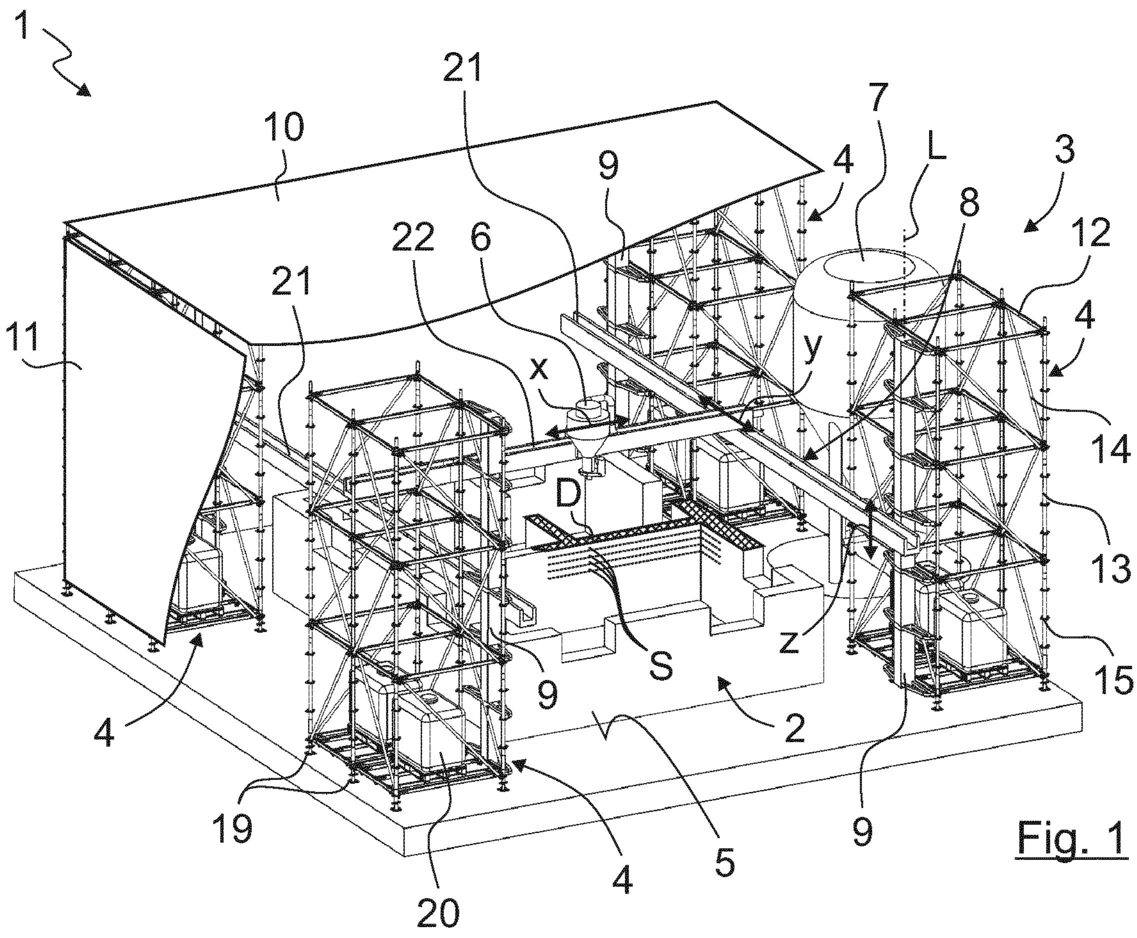
FIG. 1 is a perspectival view of an arrangement according to the invention for erecting a structure with a device according to the invention for the additive manufacturing of a component of the structure, and with several stand frames for fastening vertical struts of the device.

FIG. 1 is a perspectival view of an arrangement 1 according to the invention for erecting a building. By way of example, a component 2 or a floor of the building is shown partially finished. The arrangement 1 has a device 3 for additive manufacturing of the component 2. In the exemplary embodiments, the component 2 is shown only by way of example as a floor. The component 2 can also, for example, be only one wall or some other part of the structure.

The arrangement 1 also comprises several stand frames 4. In the exemplary embodiment shown in FIG. 1, four stand frames 4 are provided by way of example.

The device 3 according to the invention is designed to additively manufacture the component 2 on a work surface 5. For this purpose, the device 3 has a material dispensing unit 6 for depositing a building material. In the exemplary embodiment, the building material is a concrete or mortar that is mixed to be flowable, which, as shown in FIG. 1 by way of example, can be provided in a concrete silo 7 or a similar storage container and made available to the material dispensing unit 6 for controlled deposition by means of a feed line.

The material dispensing unit 6 is fastened to an actuator assembly 8, which is configured to move the material dispensing unit 6 relative to the work surface 5 along a predetermined print path D. In the exemplary embodiments, the actuator assembly 8 is configured in each case to move the material dispensing unit 6 in two translational degrees of freedom x, y above the work surface 5, and in a third translational degree of freedom z vertically. In the exemplary embodiments, the print paths D correspond to the course of the outer and inner walls of the structure (shown partially cross-hatched in FIG. 1).

The actuator assembly 8 has vertical struts 9 and can thereby move the material dispensing unit 6 vertically along the longitudinal axes L of the vertical struts 9 in order to deposit the building material in layers. The vertical struts 9 are aligned at an angle, and preferably orthogonally, to the work surface 5. This vertical movement can thus provide the third degree of freedom of translation z in the movement of the material dispensing unit 6. Individual layers S of the structure are indicated in FIG. 1—partly in dashed lines.

In the exemplary embodiment of the invention shown in FIG. 1, the device 3 is designed substantially in the manner of a so-called portal/gantry printer.

In order to facilitate the provision or installation of the device 3 on the construction site, it is provided that, to ensure sufficient structural stability, the vertical struts 9 be attached to the stand frames 4 that are set up next to the work surface 5 and that are independent of the respective vertical strut 9. Each of the vertical struts 9 is fastened to its own stand frame 4, wherein the stand frames 4 are spaced apart from one another and free-standing. Such stand frames 4 are usually present anyway on a construction site or in an arrangement 1 for erection of a structure—for example, in order to enable the erection of a facade scaffolding (not shown in the figures) or to itself form a facade scaffolding in order to fasten a construction site roofing 10 (shown partly in FIG. 1) and/or to fasten a construction site screen 11 extending between several stand frames 4 (likewise only partly shown in FIG. 1). Since the stand frames 4 are also used for fastening the vertical struts 9, an advantageous synergy effect can result.

Figure 2:
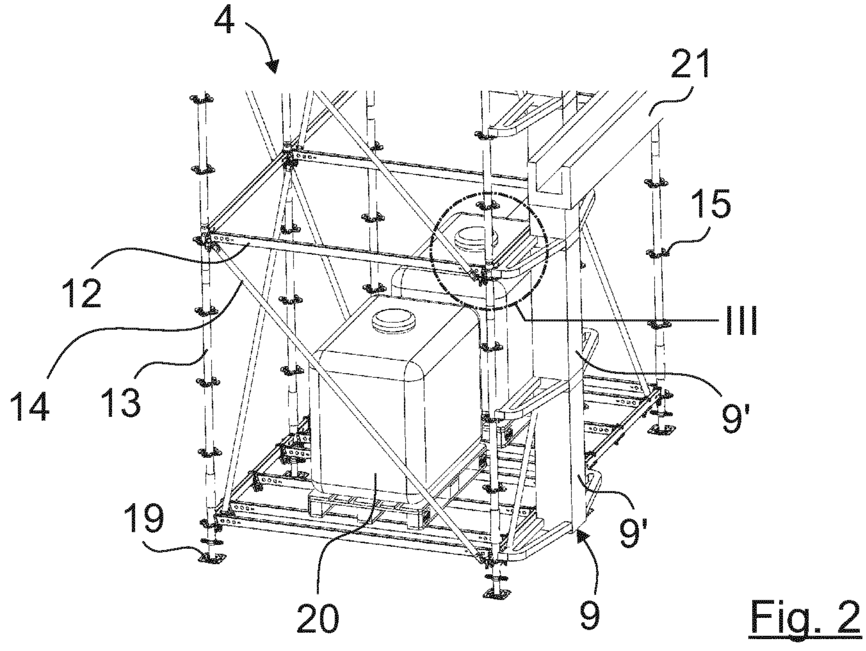
FIG. 2 is an enlarged representation of a stand frame in the region of its bottom end.

An enlarged representation of one of the stand frames 4 in the region of its bottom end is shown in FIG. 2. It can be seen here that, in the exemplary embodiment, the vertical struts 9 are attached in a suspended manner to the stand frame 4 and therefore do not themselves require any ground contact. As a result, the vertical struts 9 can be flexibly fastened in any height position, and, for example, the space below the actuator assembly 8 can advantageously be used, for example, for simultaneous provision of the already mentioned facade scaffolding. This is advantageous in particular if a floor or several floors have already been manufactured. In the exemplary embodiment, the at least one vertical strut 9 is formed in multiple parts along the longitudinal axis L from individual interconnected modular struts 9'. As a result of this modular design, it is particularly easy to disassemble the vertical strut 9 in the lower section, while the vertical strut 9 remains usable in an upper section. Thus, for example, the lowest modular struts 9' can be removed after a first vertical section of the component 2 has been produced (e.g., a floor). Optionally, the removed modular struts 9' can then be re-attached at the upper end of the respective vertical strut 9. In this way, the vertical strut 9 does not have to be provided over the entire vertical length of the component 2, and it is particularly easy to set up a facade scaffolding in stages already during the additive manufacture of the component 2, for example.

Figure 3:
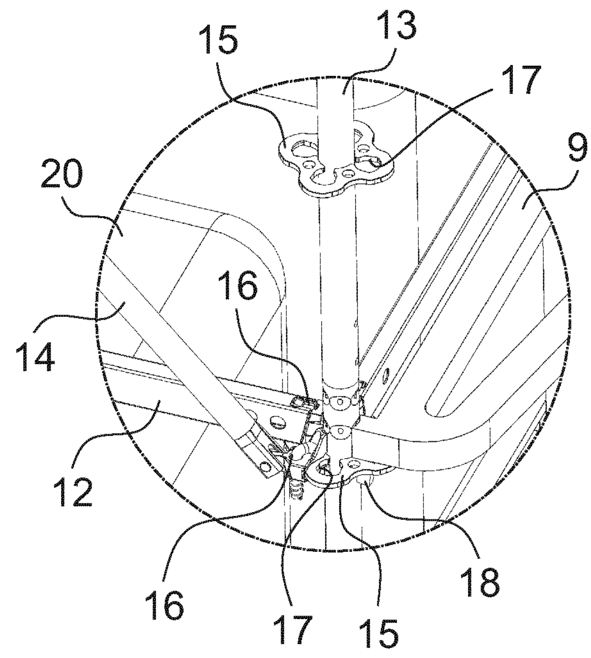
FIG. 3 is an enlargement of the cutout III of FIG. 2.

The stand frames 4 are preferably standard frames from the construction industry, made up of several horizontal scaffold posts 12 connected to one another (also known as “bars” or “horizontal bars”), vertical scaffold posts 13, and, optionally, diagonal scaffold posts 14. The scaffold standards 12, 13, 14 can be connected by means of so-called scaffolding rosettes 15 and latch heads 16 locked in the scaffolding rosettes 15, as shown in the enlarged cutout III of FIG. 3. The latching recesses 17 of the scaffolding rosettes 15 can be designed as secondary fastening elements for connection to primary fastening elements of the corresponding vertical strut 9, which, in the exemplary embodiment, is a corresponding hook 18—optionally with a wedge element for locking the hook 18.

For fastening to the stand frame 4, the vertical struts 9 have several primary fastening elements or hooks 18 distributed along the longitudinal axis L, which are equidistant from one another. In addition, the vertical struts 9 have at least two primary fastening elements or hooks 18 arranged at a common height along the longitudinal axis L and spaced apart from one another—here, two hooks 18 per modular strut 9'. Because each of the modular struts 9' has at least one of the primary fastening elements or hooks 18, the modular unhooking and connecting of the individual modular struts 9' can be further simplified without interfering with the functionality of the device 3 or the actuator assembly 8.

In particular, to compensate for an uneven base and to align the device 3, the stand frames 4 have individual, height-adjustable feet 19 (cf. FIG. 2). Furthermore, weights 20 can optionally be provided in order to further increase the structural stability. The weights 20 can be connected to the bottom end of the stand frame 4 or—as shown in the exemplary embodiments—can be arranged on the stand frame 4 in the region of the bottom end in order to correspondingly weight the stand 4. The weight 20 can preferably be a liquid tank that can be filled on location at the construction site.

According to the first embodiment of the invention shown in FIG. 1, the device 3 has at least two vertical struts 9 which are spaced apart from one another along the work surface 5 and which together form a first group of vertical struts 9 (in FIG. 1, the first group is formed by the two vertical struts 9 on the right side, which, as described below, are connected by means of the further strut formed as horizontal beam 21). Furthermore, the device 3 has at least two further vertical struts 9 which are spaced apart along the work surface 5 from one another and from the vertical struts 9 of the first group, and which together form a second group of vertical struts 9 (in FIG. 1, the second group is formed by the two vertical struts 9 on the left side, which, as described below, are connected by means of the further strut formed as horizontal beam 21).

In addition to the vertical struts 9, the actuator assembly 8 has two further struts aligned parallel to the work surface 5, which are referred to below as "horizontal beams" 21, wherein each horizontal beam 21 is assigned to a group of vertical struts 9 and is fastened to the corresponding vertical struts 9 in such a way that the horizontal beams 21 can be moved along the longitudinal axes L of the vertical struts 9.

In addition, the actuator assembly 8 has a further strut, oriented parallel to the work surface 5, which strut is referred to below as "crossbeam" 22, and which is fastened to the two, oppositely-arranged horizontal beams 21. The material dispensing unit 6 is fastened to the crossbeam 22 so as to be movable along the longitudinal axis thereof. In order to move the material dispensing unit 6 over the work surface 5, the crossbeam 22 can thus be movable along the longitudinal axes of the horizontal beams 21, and the material dispensing unit 6 can be movable along the longitudinal axis of the crossbeam 22. Finally, the composite of horizontal beams 21 and crossbeams 22 can be movable along the longitudinal axis L of the vertical struts 9 to enable the building material to be deposited in layers. This embodiment of the device 3 or of the actuator assembly 8 has proven to be particularly suitable. In principle, however, variants deviating therefrom can also be provided, as is illustrated by way of example with reference to FIGS. 4 and 5. It is even possible to completely dispense with the vertical struts 9—for example, if the material dispensing unit 6 is fastened to the crossbeam 22 via a cable pull or a similar device, and if the horizontal beams 21 are fastened directly to the stand frames 4. In addition, the structure of the actuator assembly 8 may also differ in that, for example, the material dispensing unit 8 is attached directly to exactly one vertical strut 9, which in turn is movable along the crossbeam 22 or the horizontal member 21, or in that the material dispensing unit 6 is attached to the crossbeam 22, the crossbeam 22 is attached to at least one vertical strut 9, the vertical strut 9 is attached to at least one horizontal member 21, and the at least one horizontal member 21 is attached to the stand frame 4. In principle, many modifications of this type are possible; what is essential is that the actuator assembly 8 have at least one strut 9, 21, 22 that can be fastened to the stand frame 4.

Figure 4:
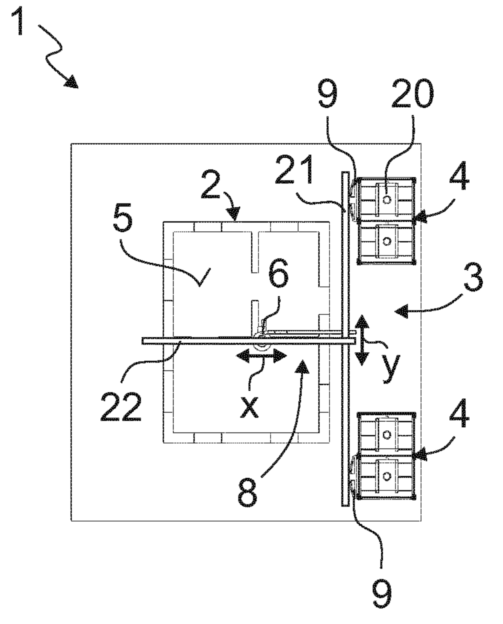
FIG. 4 is a plan view of a second embodiment of an arrangement according to the invention.

FIG. 4 shows by way of example that it is also possible for only a first group of vertical struts 9 to be provided, as well as a single horizontal beam 21 which is movably attached to the vertical struts 9 of the first group. The crossbeam 22 can thus optionally also be connected exclusively to a single horizontal beam 21 and movable along its longitudinal axis, wherein, similarly to the embodiment of FIG. 1, the material dispensing unit 6 can again be moved along the crossbeam 22.

Figure 5:
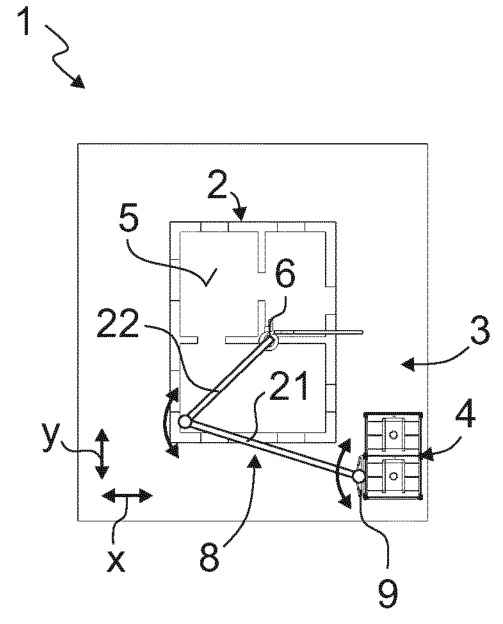
FIG. 5 is a plan view of a third embodiment of an arrangement according to the invention.

A further variant is shown in FIG. 5, according to which only a single vertical strut 9 is provided. The horizontal beam 21 is fastened to the vertical strut 9 so as to be pivotable about the longitudinal axis L of the vertical strut 9. A crossbeam 22, at the end of which the material dispensing unit 6 is arranged, is also pivotably fastened to the horizontal beam 21. Such a pivoting movement can in principle also be combined with the linear movements already described above.

A telescopic design of vertical struts 9, horizontal beams 21, and/or crossbeams 22 can also be provided. In principle, it can also be provided that the material dispensing unit 6 be movable along the horizontal beam 21; a crossbeam 22 is therefore not absolutely necessary, but can increase the range of movement.

Preferably, the vertical strut 9, the horizontal beam 21, and the crossbeam 22 are each a rigid, elongated component, as shown in the exemplary embodiments. In principle, the vertical strut 9, the horizontal beam 21, and/or the crossbeam 22 can also have a different structure; for example, they may be designed as steel cables.

The invention claimed is:

1. Device for additive manufacturing of a component on a work surface, having a material dispensing unit for depositing a building material, and an actuator assembly to which the material dispensing unit is fastened and which is configured to move the material dispensing unit relative to the work surface, wherein the actuator assembly has at least one strut along a longitudinal axis of which the material dispensing unit is movable, wherein the at least one strut of the actuator assembly is fastened to a stand frame which is set up next to the work surface and is independent of the strut, and wherein the stand frame is not part of the actuator assembly and remains stationary relative to the work surface.

2. Device according to claim 1, wherein the at least one strut is a vertical strut aligned at an angle to the work surface, and along the longitudinal axis of which the material dispensing unit can be moved in order to deposit the building material in layers.

3. Device according to claim 2,
wherein
the at least one strut, which is fastened to the stand frame, structural stability, is at least one of the vertical struts.

4. Device according to claim 2,
wherein
at least two of said vertical struts are spaced apart from one another along the work surface and together form a first group of vertical struts.

5. Device according to claim 4,
wherein
at least two further said vertical struts are spaced apart from one another along the work surface and from the vertical struts of the first group, and together form a second group of vertical struts.

6. Device according to claim 2,
wherein
at least one further of the struts is at least one horizontal beam oriented parallel to the work surface, and along the longitudinal axis of which the material dispensing unit can be moved in order to deposit the building material parallel to the work surface along a first spatial direction.

7. Device according to claim 4,
wherein
at least one horizontal beam is oriented parallel to the work surface, the at least one horizontal beam being fastened to exactly one of the vertical struts or to all vertical struts of a common group of vertical struts and being movable along the longitudinal axes of the vertical struts.

8. Device according to claim 6,
wherein
at least one further of the struts is a crossbeam oriented parallel to the work surface, and along the longitudinal axis of which the material dispensing unit is movable in order to deposit the building material parallel to the work surface along a second spatial direction, and which is fastened to exactly one of the horizontal beams or to two horizontal beams arranged opposite one another, wherein the material dispensing unit is fastened to the crossbeam.

9. Device according to claim 8,
wherein
the material dispensing unit can be moved over the work surface, wherein the horizontal beam is designed to be pivotable about the longitudinal axis of the vertical strut, and/or wherein the crossbeam is pivotable relative to the horizontal beam.

10. Device according to claim 8,
wherein
the material dispensing unit can be moved over the work surface, wherein the material dispensing unit is linearly movable along the horizontal beam or along the crossbeam, and/or wherein the crossbeam is linearly movable along the horizontal beam.

11. Device according to claim 1,
wherein
the strut has at least one primary fastening element for fastening to the stand frame.

12. Device according to claim 11,
wherein
the primary fastening element is designed as a hook, wedge element, scaffold coupling, screw element, clamping element, and/or latching recess.

13. Device according to claim 11,
wherein
the at least one vertical strut for fastening to the stand frame has several primary fastening elements arranged distributed along the longitudinal axis, which are preferably equidistant from one another.

14. Device according to claim 11,
wherein
the at least one vertical strut has at least two primary fastening elements which are arranged at a common height along the longitudinal axis and are spaced apart from one another.

15. Device according to claim 2,
wherein
the at least one vertical strut along the longitudinal axis is formed in multiple parts from individual modular struts that can be connected to one another.

16. Device according to claim 15,
wherein
each of the modular struts has at least one primary fastening element for fastening to the stand frame.

* * * * *